United States Patent [19]

Huffman et al.

[11] 4,090,205
[45] May 16, 1978

[54] APPARATUS AND METHOD FOR JET DROP PRINTING

[75] Inventors: Harold W. Huffman, Fairfield, Ohio; Richard H. Lyon, Belmont, Mass.; David G. Holmes, Potsdam, N.Y.; John W. Donahue, Bellbrook, Ohio

[73] Assignee: The Mead Corporation, Dayton, Ohio

[21] Appl. No.: 785,059

[22] Filed: Apr. 6, 1977

[51] Int. Cl.² .................... G01D 15/18; G01D 15/24
[52] U.S. Cl. ........................................ 346/75; 346/136
[58] Field of Search ............................ 346/75, 1, 136

[56] References Cited

U.S. PATENT DOCUMENTS 3,737,914  6/1973  Hertz ..................................... 346/75

OTHER PUBLICATIONS

Hoekstra, J. P., Asynchronous Ink Jet Printing System, Mar. 1973, IBM Technical Disclosure Bulletin, vol. 15, No. 10, pp. 3080-3081.

Primary Examiner—George H. Miller, Jr.
Attorney, Agent, or Firm—Biebel, French & Nauman

[57] ABSTRACT

A jet drop printer prints graphic information upon an oscillating printing medium. The printer has a row of jet forming nozzles which produce a row of spaced drop streams. The drops in the streams are selectively charged, deflected and caught, so that uncharged drops produce intelligible graphic information on the printing medium. The spacing between the jets is such that they cannot print contiguous traces upon an ordinary transported printing medium. Contiguous printing is accomplished by lateral oscillation of the printing medium. The oscillation of the printing medium causes each jet to be directed at a plurality of lateral printing positions on a sequential basis, and data representing printing information for the different printing positions is multiplexed into the drop switching system in synchronism with the oscillation of the printing medium.

Oscillation of the printing medium may be accomplished by a web transport system including a cylindrical roller and an axially driven oscillator connected thereto. The roller has an internal cavity large in diameter at the midpoint of the roller and relatively small in diameter at the support points of the roller. This causes an axially varying roller cross-sectional area which reduces roller distortion at the relative high axial vibration frequency.

15 Claims, 9 Drawing Figures

APPARATUS AND METHOD FOR JET DROP PRINTING

BACKGROUND OF THE INVENTION

This invention relates to jet drop printing by a plurality of liquid jets arranged in one or more rows. In the preferred embodiment it relates to jet drop recording with a recording head of the general type shown in Sweet et al. U.S. Pat. No. 3,373,437.

As shown in the Sweet patent a recording liquid is forced through a row of nozzles arranged along a straight line to form a row of liquid jets. These jets are stimulated to break up into uniformily sized and regularly spaced drops, which are selectively deflected and caught in accordance with printing control signals applied to a series of electrodes. Drops which are not so deflected and caught deposit upon a moving web to print an image thereon.

A major problem with recording heads of the Sweet et al type has been the relatively limited resolution available therefrom. This difficulty is caused by physical limitations on the spacing between the jet nozzles and the spacing between switching control devices necessarily required for each jet. Heretofore the only satisfactory solution has been to provide a plurality of rows of such jets and to switch them with appropriate time delays as taught in Taylor et al. U.S. Pat. No. 3,560,641.

Advances in fabrication techniques have progressively shrunk spacing requirements, so that it is now possible to accomplish reasonably good resolution with only two rows of jets as taught in Mathis U.S. Pat. No. 3,701,998. However, the Mathis print head is somewhat complex and has inherent resolution limits.

One technique for obtaining improved resolution from a row of ink jets is to oscillate the nozzles and their control components as taught by Hertz U.S. Pat. No. 3,737,914. However, jet drop print heads tend to be somewhat massive and difficult to oscillate at the frequency required for high resolution. At these frequencies, which may be in the order of about 10 kHz, the print head becomes elastic. Moreover for print heads of the Sweet et al. type it is necessary to stimulate the jets at a frequency which may be an harmonic of the head oscillation frequency. Thus the head oscillation interferes with stimulation.

SUMMARY OF THE INVENTION

This invention improves the resolution of a jet drop print head by oscillating the printing medium while maintaining the print head stationary, or relatively so. The print head, which may generate and switch one, two, or more rows of jets is operated in multiplexed fashion to receive and process printing control information for printing positions in excess of the total number of jets. The printing medium, which is preferably a longitudinally transported web of paper or other material, is laterally oscillated in synchronism in operation with the jets, so that each jet prints information for a plurality of laterally adjoining print positions.

The transport means preferably comprises a roller having a cross-sectional area which is relatively small at the axial midpoint and which is progressively increased in both directions toward the two points adjacent the edges of the active printing area. This reduces axial distortion of the roller at the relatively high oscillation frequency.

It is therefore an object of this invention to improve the printing resolution of a jet drop print head.

It is another object of this invention to oscillate a print receiving web at a frequency for improving the resolution of printing thereon by a jet drop recording head.

Other and further objects of the invention will be apparent from the following description, the accompanying drawings and the appended claims.

DESCRIPTION OF THE PREFERRED EMBODIMENTS

Figure 1:
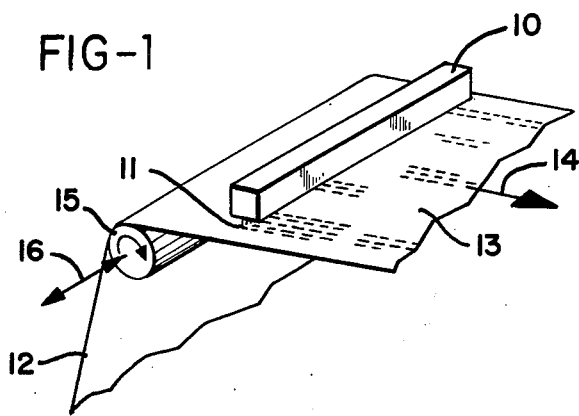
FIG. 1 is a perspective view of a print receiving web being transported under a jet drop recording head.

Jet drop printing may be accomplished in accordance with this invention by a jet drop print head 10 as illustrated in FIG. 1. Print head 10 produces a row of jets 11, which are directed downwardly toward a moving web 12 to print graphic information thereon within a printed region 13. Web 12 is transported longitudinally in the direction of arrow 14 and passes over a roller 15. A vibrator 31 (FIG. 6) oscillates roller 15 and web 12 laterally in the direction indicated by the arrow 16. The wrap and tension of the web are appropriately adjusted to assure an adequate grip against the surface of roller 15. The gripping action may also be improved by a slight roughening of the roller surface.

Figure 8:
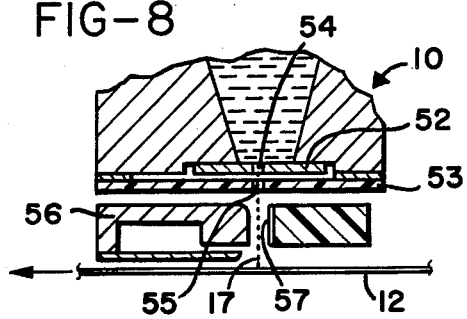
FIG. 8 is a cross-sectional view of a jet drop recording head.

As shown in FIG. 8, an individual jet 17 of the row 11 exits from an orifice 54 in an orifice plate 52 and is stimulated to break up into drops; the drops being controlled either for deposition in the area 13 or for catching by a catcher 56. Preferably the drop control is accomplished by a series of charge rings 55 in a charge plate 53, which selectively charge the drops for deflection by an electrical field set up between catcher 56 and a deflection electrode 57. It is also feasible, however, to utilize magnetic deflection as taught in Johnson U.S. Pat. No. 3,510,878 or an alternate electrostatic switching technique as shown in Hertz U.S. Pat. No. 3,737,914. Also the print head 10 could be constructed as shown in Mathis U.S. Pat. No. 3,701,998, in which case there would be two rows of interlaced jets. In the case of the two row system the row of jets displaced longitudinally in the direction of the arrow 14 would be switched with a time delay, so that the two rows of jets are functionally equivalent to the single illustrated row 11.

Figure 2:
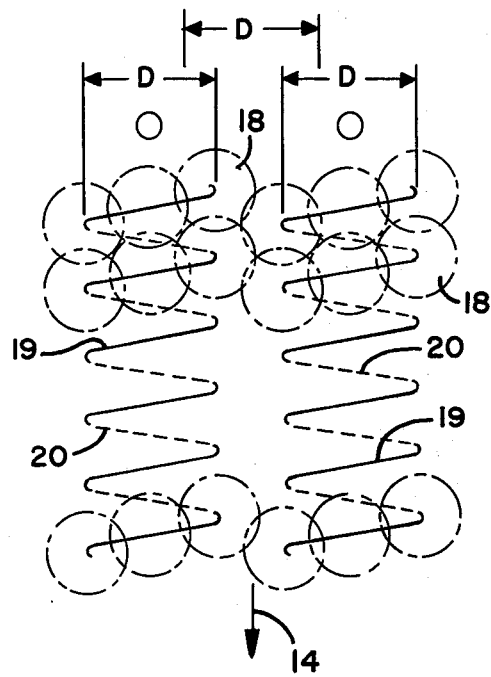
FIG. 2 is a schematic illustration of printing marks made sequentially by two adjacent jets.

FIG. 2 illustrates the printing coverage which may be obtained from two laterally adjacent jets 17, which are stimulated and switched in accordance with the prior art but which are directed toward a web 12 oscillated in accordance with this invention. Each jet is stimulated to break up into drops at a frequency in the order of about 40 Khz, and each drop which deposits on the web 12 prints a circular area 18. Web 12 is oscillated laterally an amount ±D/2, so that the jets print tracks thereon which have a width D as illustrated. The jets 17 are laterally separated by a distance 3D/2, and the web oscillation frequency is adjusted to produce overlap of areas 18 as illustrated. For production of printing patterns as illustrated in FIG. 2 the frequency of web oscillation is one-fourth the frequency of jet stimulation, and therefore may be about 10 kHz.

The oscillation of web 12 causes the jets 17 to trace sinusoidal paths thereon. These sinusoidal paths are illustrated in FIG. 2 as having solid line portions 19 and dotted line portions 20. During each full sinusoidal cycle each jet 17 generates four drops. Three such drops deposit on web 12 to form printed areas 18 centered along on the solid line portions 19. The data system is designed to cause catching of the fourth drop, so that there will be no printing during the retrace interval illustrated by the dotted lines 20.

As illustrated in FIG. 2 the drop deposits 18 may have a diameter of about 9 mils, which is an example given for illustrative purposes only. A higher resolution system may print dots in five, seven or more positions during oscillation of head 10 with correspondingly smaller dots and higher stimulation frequencies. For instance, a system which scans each jet to five dot positions per oscillation cycle may print 4.6 mil dots at a stimulation frequency of 80 kHz.

It is a routine matter to select the appropriate orifice size and ink supply pressure for production of the desired dot size at the indicated stimulation frequency. For a 9 mil dot at a stimulation frequency of 40 kHz, an appropriate orifice diameter is about 2.5 mils, and the ink supply pressure should be adjusted to produce a flow rate through the orifice of about 1.55 ml. per minute. A matching speed for web 12 is about 375 ft. per minute, which will move the web about 7.5 mils during each oscillation cycle.

The peak-to-peak displacement D illustrated in FIG. 2 is about 15 mils (0.015 inches), and the frequency of the illustrated oscillation is 10 kHz. It will be appreciated that a roller, such as roller 15, which may have a diameter of about 2 inches, is a rather sizable mass for a peak-to-peak oscillation of 15 mils at such a high frequency. A suitable driver for such oscillation may be purchased from Hydroacoustics, Inc. of Rochester, N.Y. and may be constructed as shown in Bouyoucous et al. U.S. Pat. No. 3,004,512. However, under such vibration conditions roller 15 behaves elastically, so that the displacement at the ends is not the same as the displacement in the middle.

For a roller of uniform cross section undergoing sinusoidal oscillation, the peak-to-peak displacement at any point X (measured from the center), is found to be given by the relation $$S_x = S_o \cos Kx.$$

In this equation K is the wave number ($2\pi f/c$), and C is the wave speed or the speed at which a vibration travels along the length of the roller.

It will be seen by examination of the above equation that there are nodes at points situated a distance $c/4f$ from the center. This means that a web of paper being transported over the roller 15 would be laterally oscillated at the center but would have no oscillation at all in the region contacting the roller nodes. For a typical roller suitable for this application the wave speed may be about 188,000 inches per second, so that the wave No. K has a value of about 0.334 per inch at a frequency of 10 kHz. This means that nodes exist at stations ± 4.7 inches.

Figure 3:
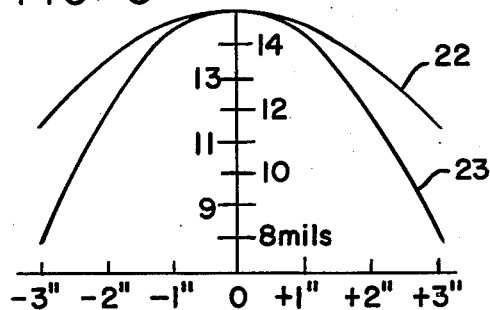
FIG. 3 is an illustration of mode shapes for oscillated rollers of uniform cross section and linearly varying cross-sectional areas.

FIG. 3 illustrates the distortion for a roller having an active print width of 6 inches and oscillated at a frequency of 10 kHz, curve 23 being applicable for a uniform cross section. As shown by curve 23, an oscillation of 15 mils peak-to-peak at the center corresponds to only 8.1 mils at the edges. This amounts to a distortion of 46 percent.

Figure 9:
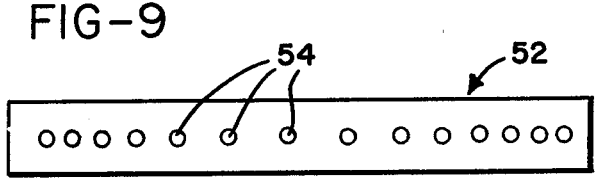
FIG. 9 is a drawing of an orifice plate.

It will be readily apparent that such distortion degrades the quality of the printing produced by the vibrated system. More particularly, the distortion produces a striping effect near the edges, because the paper is not moved a sufficient lateral distance to fill in voids between the jets. This can be alleviated to some degree by adjusting the jet spacing to be closer together at the ends than at the middle. Such jet spacing adjustment is made by adjusting the distance between orifices 54 of orifice plate 52 as shown somewhat schematically in FIG. 9. Of course, there must also be a corresponding adjustment in the spacing of charge electrodes 55.

Jet spacing adjustment does not entirely solve the elasticity problem, because the vibration distance variation causes deposition of more ink per unit area at printed areas near the edge than at the center of the print. The result is a general darkening of the print along the edges. Further compensation can be achieved by decreasing the orifice diameter for the jets near the edge, but this reduces dot to dot overlap in the direction of web travel.

Figure 4:
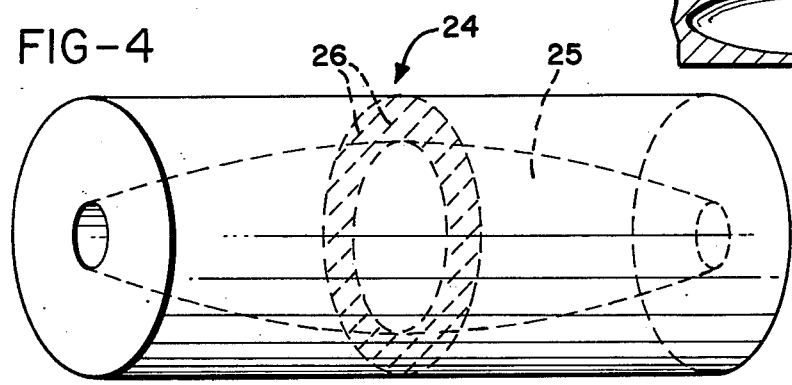
FIG. 4 is a schematic illustration of a roller for use in the practice of this invention.

The problems produced by roller elasticity can be reduced by providing a roller having a non-uniform cross section in the area of active printing. Such a roller is illustrated schematically in FIG. 4 as designated generally by the numeral 24. Inside roller 24 is a hollow region 25, which produces an annular cross section 26. The shape of the hollow region 25 may be adjusted for minimizing distortion of the roller across the active printing area, and for this purpose the adjustment should be made in such a manner that the area 26 is smaller at the center of the roller than at the ends (i.e., larger inside diameter at center).

Figure 5:
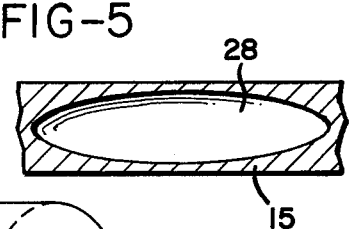
FIG. 5 is a cross-sectional illustration of a roller having a linearly varying axial cross section.

It is in general a very complex problem to determine an ideal area profile for the roller. However, it has been found that very marked improvement may be achieved by utilizing a uniform taper, tapering from a very small cross-sectional area in the center to a solid cylinder at the edges of the print area. Such a uniform tapering of cross-sectional area may be produced by a parabolic cavity 28 as shown in FIG. 5. A profile of this type, adjusted for an area ratio of 6:1 between the center and the ends of the cavity, results in a distortion curve such as curve 22 of FIG. 3. This configuration vibrates 10.6 mils at the edges when the center vibrates 15 mils, which means that the distortion at the edge regions is only 29.2 percent. This rather considerable improvement over the uniform roller is produced by linearly tapering the diameter of the internal cavity from 1.83 inches at the center to 0 at the ends.

Quite obviously the cavity as described above weakens the roller substantially at the center. However, this does not create a problem from a vibrational driving point of view, because the roller is thinest where the strain is least. Thus there is no significant increase in longitudinal stress at the center.

The mathematical expression defining the peak-to-peak vibrational displacement for a roller having a linearly tapered cross section and a very thin cross section at the center station is given approximately by the relation $S_x = S_o J_o(Kx)$. In this relation $J_o$ refers to a Bessel function of the first kind and order zero. The curve 22 of FIG. 3 is a plot of this equation. For this plot it is assumed again that the wave speed is 188,000 inches per second and that driving vibration is at a frequency of 10 kHz with a peak-to-peak displacement of 15 mils.

Comparing line 22 with line 23, it will be seen that the uniformly tapered cross-sectional area reduces distortion at all stations by approximately 50 percent. Even this reduced distortion, however, can be expected to produce some striping under certain printing conditions. Again the striping can be eliminated by adjusting the spacing between orifices 54 in orifice plate 52. At any point along the head the appropriate spacing is given by the relation $$22.5 - 15 [1 - J_o(Kx)].$$

In accordance with this relation the spacing between orifices should be 22.5 mils at the center of the bar and 19.0 mils at the ends for $x = 3$ and $K = 0.334$. While this eliminates striping there is an increase in ink deposition per unit area near the edges of the print. This produces a minor darkening of solid printing in those areas.

Figure 6:
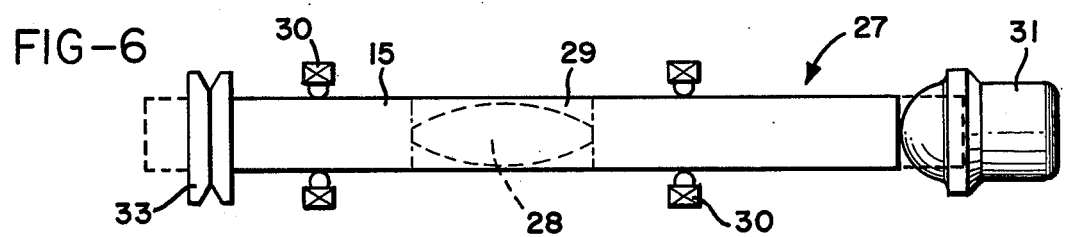
FIG. 6 is a schematic illustration of a roller oscillation and support arrangement.

FIG. 6 illustrates a roller assembly 27 configured in accordance with this invention. Roller assembly 27 comprises the roller 15 which is supported by bearings 30 and axially vibrated by a vibrating unit 31 as described above. Roller 15 is provided with a parabolic internal cavity 28 for minimizing axial distortion along its working region 29. Working region 29 may be 6 inches long, and the entire length between bearings 30 may be 12.32 inches. Distortion of roller 28 within the working region will be as shown by curve 22 of FIG. 3, and vibrational nodes will occur at the points of support by bearings 30. A rotational driving unit 50 (FIG. 7) rotates roller 15 by means of a vee belt 49 which works against pulley 33.

In order to achieve resonance in the working region 29 of roller 15 it is necessary that the acoustic impedance looking outwardly from the support points at bearings 30 match the impedance looking inwardly therefrom. For the 2 inch roller of this design, it has been found that there should be a roller free end extension of 4.7 inches (¼ wave length) from the left hand bearing 30 of FIG. 6 and a driving end extension of 9.4 inches (½ wave length) from the right hand bearing. However, these extensions must be shortened to compensate for the inertia of pulley 33 and the compliance of driver 31. The phantom lines at the ends of roller 15 indicate material removed from the roller to compensate for such inertia and compliance.

Figure 7:
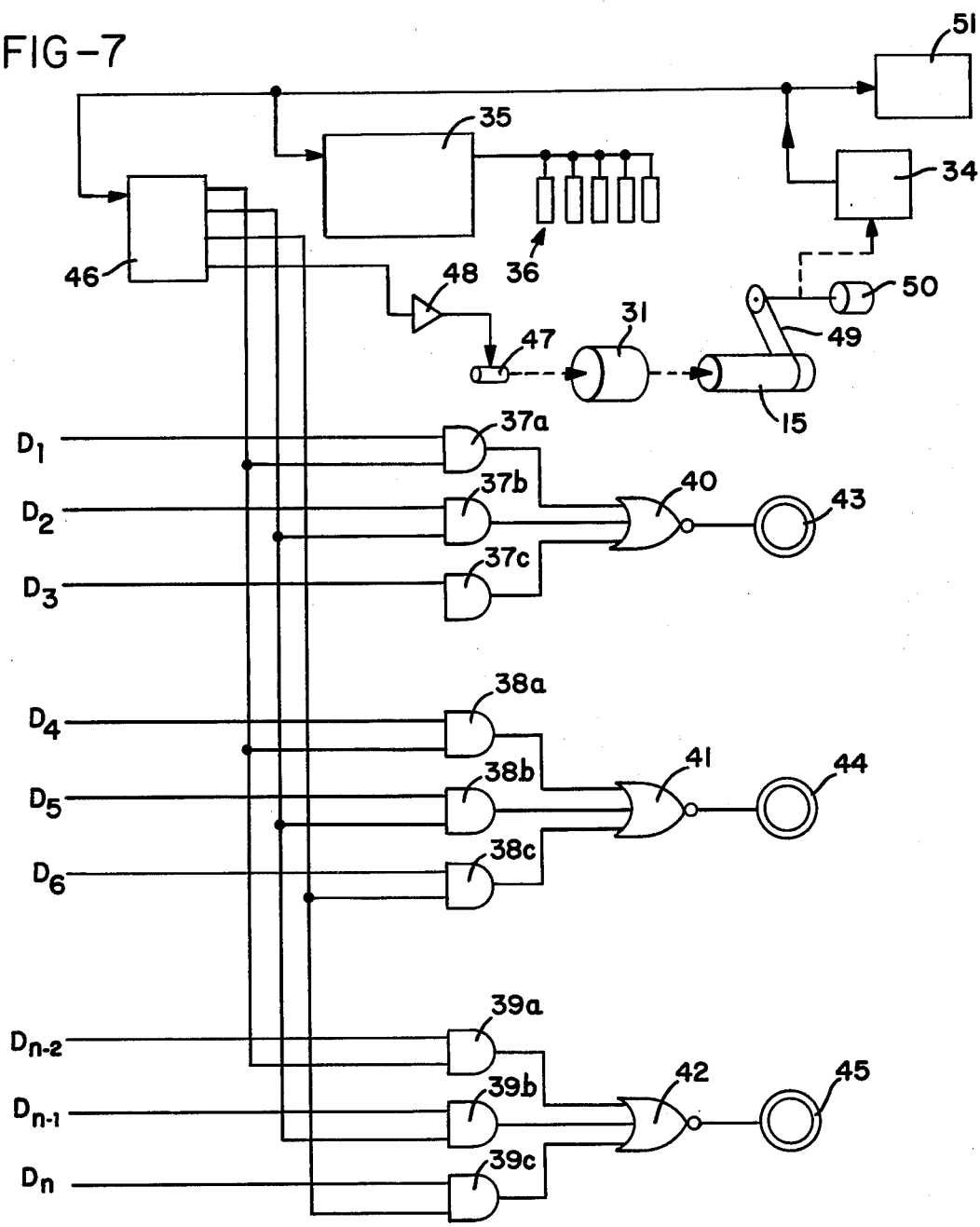
FIG. 7 is a schematic diagram of a data multiplexing system for ink jet switching control.

A data system for operation of print head 10 is illustrated in FIG. 7. As illustrated in that figure an encoder 34 generates a timing signal at a frequency of approximately 40 kHz in response to actual rotation of the drive shaft of a motor 50. Motor 50 drives belt 49 for rotating roller 28 and transporting the print receiving web in the longitudinal direction. The 40 kHz signal from encoder 34 is supplied to data control circuitry 51, wave shaping circuit 35 and a divider 46.

Wave shaping circuit 35 is designed to produce a suitably shaped 40 kHz driving signal for an array of stimulation transducers 36. Transducers 36 operate as taught by Titus et al. U.S. Pat. No. 3,900,162 to stimulate all of the row of printing jets in synchronism. As a result thereof the jets 17 break up into drops for production of circular printed dots such as dots 18 of FIG. 2. Divider 46, which also receives the 40 KHz signal, may include a two bit counter and a decoder for producing four 10 kHz gating signals, three of which are connected to a series of AND gates as illustrated. The four 10 kHz output signals from circuit 46 are square waves shifted in phase relative to each other.

One output from circuit 46 is amplified by amplifier 48 to drive a 10 kHz oscillator 47, which is mechanically coupled to vibrating unit 31. Vibrating unit 31 is constructed as taught by the above mentioned Bouyoucous et al. patent and is positioned for axial vibration of roller 15. Oscillator 47 is connected to the control valve of vibrator 31 to cause vibration of roller 15 at the correct, phase relative to the 10 kHz data signals being applied to the AND gating arrangement.

Print head 10 may have a large number of charge rings, three of which are illustrated in FIG. 7 and denoted by the reference numerals 43, 44 and 45. Charge rings 43 through 45 are each connected for drop switching under control of three different data input lines. Thus data lines $D_1$ through $D_3$ are connected through AND gates 37A through 37C and NOR gate 40 to charge ring 43. Three output signals from circuit 46 enable AND gates 37A through 37C cyclically to multiplex data lines $D_1$ through $D_3$ into NOR gate 40. In the absence of a print command on any of lines $D_1$ through $D_3$ the output from NOR gate 40 is HI, and charge ring 43 is in the catch mode wherein drops are charged and deflected into a catcher to prevent printing.

Whenever a print signal appears on any of lines $D_1$ through $D_3$ it is multiplexed into NOR gate 40 at the appropriate time for application of a LO output to charge ring 43. This enables production of printed circular dots 18 during alternate half cycles of roller oscillation as indicated by lines 19 of FIG. 2. Driving signals for oscillator 47 are generated during the retrace time as indicated by the dotted lines 20. While retrace is occurring, a HI signal is applied to charge ring 43, so that the drops generated during that time interval are caught.

Similarly charge ring 44 is driven by AND gates 38A through 38C and NOR gate 41 through print data appearing on lines $D_4$ through $D_6$. The same holds true for other charge rings up to and including charge ring 45, which operates under control of AND gates 39A through 39C and NOR gate 42 to print the data appearing on lines $D_{n-2}$ through $D_n$. It should be observed that some data compression will be necessary to compensate for non-uniform jet spacing as indicated by orifices 54 of FIG. 9. Moreover, it will be understood that the stimulation produced by transducer array 36 should be synchronized with the data on the input data lines $D_1$ through $D_n$. This is accomplished by reason of the fact that data controller 51 is driven by the output signal from encoder 34. Data controller 51 gates the generation of data signals on the illustrated data lines as taught by Van Brimer et al. U.S. Pat. No. 3,588,906.

While the method herein described and the form of apparatus for carrying this method into effect constitute preferred embodiments of the invention, it is to be understood that the invention is not limited to this precise method and form of apparatus, and that changes may be made in either without departing from the scope of the invention.

We claim:

1. A jet drop recording system comprising means for generating a spaced row of liquid jets, stimulation means for causing said jets to break up into drops at a predetermined frequency, catching means responsive to printing control signals for selectively catching predetermined ones of said drops, and means for transporting a print receiving medium longitudinally through a printing zone to cause deposition thereon of those of said drops not caught as aforesaid, characterized in that said transporting means oscillates said print receiving medium laterally to produce lateral overlapping of drop deposits from adjacent jets.

2. A jet drop recording system according to claim 1 characterized in that said catching means prevents drop deposition on said print receiving medium during alternate half cycles of said lateral oscillation.

3. A jet drop recording system according to claim 2 characterized in that said stimulation means operates in synchronism with said lateral oscillation.

4. A jet drop recording system according to claim 1 characterized in that said print receiving medium is a web and said transporting means comprises an axially oscillating roller in contact with said web.

5. A jet drop recording system according to claim 4 characterized in that the spacing between said liquid jets is adjusted to reduce the striping of said print receiving medium which results naturally from elasticity of the roller at the frequency of said axial oscillation.

6. A jet drop recording system according to claim 5 characterized in that the spacing between liquid jets near the ends of said row is greater than the spacing between jets near the center thereof; said spacing decreasing progressively from the center to the ends.

7. A jet drop recording system according to claim 4 characterized in that the cross-sectional area of said roller is axially adjusted to reduce distortion of the roller at the frequency of said axial oscillation.

8. A jet drop recording system according to claim 7 characterized in that the frequency of said axial oscillation is one-fourth the frequency of said predetermined drop stimulation frequency and the maximum peak-to-peak amplitude of said axial oscillation is equal to two-thirds the maximum lateral distance between adjacent jets in said row.

9. A jet drop recording system according to claim 7 characterized in that the cross-sectional area of said roller is greater at its ends than at its midpoint.

10. A jet drop recording system according to claim 9 characterized in that said cross-sectional area decreases in a linear manner from a maximum value at the roller midpoint to a minimum value at points situated at the end of said printing zone.

11. A jet drop recording system according to claim 9 characterized in that said roller has a cylindrical outer surface and an internal cavity which progressively decreases in diameter at axial locations ranging from the roller midpoint to points situated at the ends of said printing zone.

12. A jet drop recording system according to claim 11 characterized in that said roller is supported at points which are vibrational nodes.

13. Jet drop recording apparatus comprising:
(a) a print head including means for defining a row of spaced orifices arranged with a spacing which decreases progressively from the center outwardly toward the two ends of said row, means for causing jets of recording liquid to flow through said orifices, and a catcher for selective catching of said jets,
(b) Jet deflection means including a row of charging electrodes spaced in correspondence with the spacing of said orifices for controlling said selective catching,
(c) jet stimulation means for causing said jets to break up into regularly spaced drops,
(d) web transport means, including a roller having a cross section which increases progressively from its midpoint to points adjacent the ends of said row, for transporting a print receiving web longitudinally through the active printing zone of said jets,
(e) vibrating means for vibrating said roller axially to cause said jets to provide solid printing coverage of a longitudinally extending printing region on said web,
(f) support means for supporting said roller at nodal points occurring as a result of said axial vibration,
(g) data generation means for controlling the operation of said jet deflection means, and
(h) synchronizing means for synchronizing the operation of said stimulation means, said vibrating means and said data generation means.

14. A method of jet drop printing comprising the steps of:
(a) generating a row of spaced streams of liquid printing drops,
(b) selectively catching certain of said drops in accordance with data signals representative of an image to be printed,
(c) transporting a print receiving medium through the active region of said drops, and
(d) oscillating said print receiving medium to cause printing of the spaces between said streams.

15. A method according to claim 14 wherein said oscillating and said generating are carried out in synchronism with said data signals.

* * * * *